United States Patent
Kinoshita et al.

(10) Patent No.: US 6,516,374 B1
(45) Date of Patent: Feb. 4, 2003

(54) METHOD FOR DOCKING/UNDOCKING A PORTABLE COMPUTER TO/FROM AN EXPANSION UNIT

(75) Inventors: Hidenori Kinoshita, Machida (JP); Mitsuru Ogawa, Yamato (JP); Yasuhiro Kobayashi, Atsugi (JP); Takayuki Katoh, Yokohama (JP); Shinobu Miyachi, Sagamihara (JP); Takashi Yomo, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/548,035

(22) Filed: Apr. 12, 2000

(30) Foreign Application Priority Data

Apr. 13, 1999 (JP) .............................. 11-105595

(51) Int. Cl.[7] .............................. G06F 1/26; G06F 1/18; G06F 1/32
(52) U.S. Cl. .................. 710/304; 710/62; 710/302; 710/303; 713/300; 713/323; 713/340
(58) Field of Search ............... 710/62, 302–304; 713/300, 310, 323, 330, 340

(56) References Cited

U.S. PATENT DOCUMENTS

| | | | | |
|---|---|---|---|---|
| 5,488,572 A | * | 1/1996 | Belmont | 360/99.06 |
| 5,860,015 A | * | 1/1999 | Olson | 713/300 |
| 6,209,105 B1 | * | 3/2001 | Hamamoto | 710/303 |

* cited by examiner

Primary Examiner—Jeffrey Gaffin
Assistant Examiner—Ilwoo Park
(74) Attorney, Agent, or Firm—J. Bruce Schelkopf; Bracewell & Patterson

(57) ABSTRACT

A method for docking/undocking a portable computer to/from an expansion unit is disclosed. The portable computer includes a main battery, and the expansion unit includes a second battery. In response to an eject event, the condition of the second battery is determined. If the second battery is in a discharging condition, a power supply route is switched from the second battery of the expansion unit to the main battery of the portable computer. If the second battery is in a charging condition, the charging condition is suspended. At this point, a hot undocking of the portable computer from the expansion unit can be performed.

2 Claims, 11 Drawing Sheets

METHOD FOR DOCKING/UNDOCKING A PORTABLE COMPUTER TO/FROM AN EXPANSION UNIT

BACKGROUND OF THE INVENTION

1. Technical Field

The present invention relates to portable computers in general, and in particular to portable computers and docking stations. Still more particularly, the present invention relates to a method for docking/undocking a portable computer to/from an expansion unit.

2. Description of the Prior Art

The number of functions that a portable computer, such as a notebook personal computer (PC), a sub-notebook PC, a palm-top PC, or a Personal Data Assistant (PDA), can provided is limited. An expansion unit or a docking station, can typically be utilized to increase the number of functions of a portable computer.

The procedure of electrically and logically connecting a portable computer to a docking station is commonly referred to as docking. A portable computer cannot operate an expansion unit when the portable computer is only electrically connected to the docking station. In order for the portable computer to operate the docking station, an operating system (OS) within the portable computer is required to recognize the docking station via a procedure known as logical connection. Docking is not completed until the OS logically connects the docking station to the portable computer such that the portable computer is ready to use the docking station. Conversely, electrically and logically separating a portable computer from the docking station is referred to as undocking. Hot docking or hot undocking refers to docking or undocking a portable computer when the portable computer is in an active or operating state. Warm docking or warm undocking refers to docking or undocking the portable computer when the portable computer is in a suspended or standby state.

Typically, a second battery is included within an expansion unit. If the expansion unit is undocked while the second battery is charged or discharged, the portable computer is shut down. This is because the portable computer uses the second battery of the expansion unit when the portable computer is docked at the expansion unit. When the portable computer is undocked, it is impossible to use the second battery of the expansion unit. Thus, the portable computer must switch power routes from the second battery to the main battery of the portable computer. Because it takes a long time to switch power routes, it is impossible to immediately correspond to undocking of the docking station.

An inexpensive system typically does not have a PCI-PCI bridge chip, and a PCI bus of the inexpensive system is directly connected to a PCI bus of an expansion unit by only putting a bus switch between the two buses. As a result, docking/undocking can only be executed when the system is suspended or powered off. In other words, hot docking/undocking cannot be performed.

When a portable computer is hot docked to a docking station having an IDE device and an FDD device, latch-up can occur if the interfaces of these devices are being hot docked. As a result, these devices could be damaged.

When a portable computer supports warm undocking, a problem occurs when there is an increase in time required for resuming from a suspended state. This is because an OS for supporting warm undocking must eject (logically separate) every resource that may be warm undocked whenever a system is suspended. As a result, the OS must perform enumeration of a resource whenever the system resumes from the suspended state.

In light of all the above-mentioned problems, it would be desirable to provide an improved method for docking/undocking a portable computer to/from an expansion unit.

SUMMARY OF THE INVENTION

In accordance with a preferred method of the present invention, a portable computer includes a main battery, and an expansion unit includes a second battery. In response to an eject event, the condition of the second battery is determined. If the second battery is in a discharging condition, a power supply route is switched from the second battery of the expansion unit to the main battery of the portable computer. If the second battery is in a charging condition, the charging condition is suspended. At this point, a hot undocking of the portable computer from the expansion unit can be performed.

All objects, features, and advantages of the present invention will become apparent in the following detailed written description.

DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DESCRIPTION OF A PREFERRED EMBODIMENT

Figure 1:
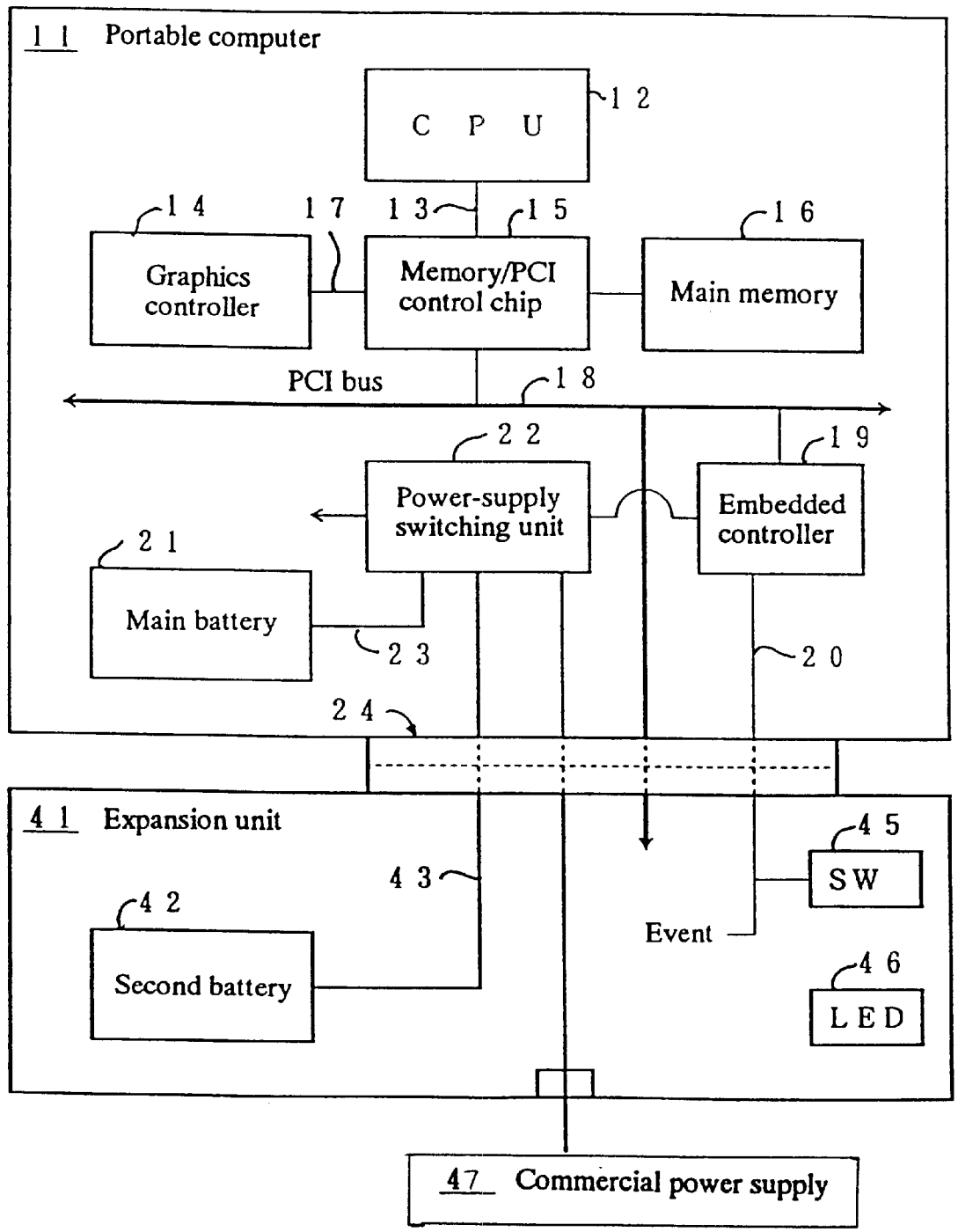
FIG. 1 is a block diagram depicting a portable computer and a docking station, in accordance with a first embodiment of the present invention.

Referring now to FIG. 1, there is illustrated a block diagram of a portable computer 11 and an expansion unit 41, in accordance with a first embodiment of the present invention. Portable computer 11 includes a central processing unit (CPU) 12, a processor bus 13, a graphics controller 14, a memory/PCI control chip 15, a main memory 16, an Accelerated Graphics Port (AGP) 17, a peripheral component interconnect (PCI) bus 18, an embedded controller 19, a sense/control signal line 20, a main battery 21, a power-supply switching unit 22, a main-battery power supply cable 23, and a connector 24.

Processor bus 13 is a very-high speed bus for connecting CPU 12 to memory/PCI control chip 15. Graphics controller 14 controls outputs to display units such as a (cathode ray tube) CRT and a liquid crystal display (LCD). Graphics controller 14 and memory/PCI control chip 15 are connected each other by AGP 17. AGP 17 is a standard port dedicated to graphics. This is a port allowing graphics to be drawn at a high speed by directly connecting graphics controller 14 with memory/PCI control chip 15 without passing through PCI bus 18. Memory/PCI control chip 15 connects CPU 12, main memory 16, and PCI bus 18 to each other. Main memory 16 is a set of dynamic random access memories (DRAMs) that can be directly read or written by CPU 12. PCI bus 18 is a bus recently used as a standard high-speed bus for personal computers (PCs).

Embedded controller 19 controls various functions of portable computer 11. For example, embedded controller 19 controls a keyboard and/or mouse, a power supply, the docking/undocking of an expansion unit 41. In this embodiment, embedded controller 19 controls a power-supply switching unit 22.

Main battery 21 can be a battery pack. The battery pack is a removable battery. Portable computer 11 uses a lithium-ion battery or nickel-hydrogen battery. Portable computer 11 is not provided with a battery charger. Therefore, when more than the capacity of main battery 21 is required for long-time use of portable computer 11, a commercial power supply 47 is used through a second battery 42 configured by a secondary battery of expansion unit 41 by docking portable computer 11 to expansion unit 41. Thereby, it is possible to enjoy computing without taking notice of a battery driving time differently from the case of battery driving.

Power-supply switching unit 22 switches power-supply sources for various sections of portable computer 11 between main battery 21 of portable computer 11 and second battery 42 of expansion unit 41, in accordance with the control by embedded controller 19. Moreover, power-supply switching unit 22 comprises a battery charger, charges main battery 21 and second battery 42 by converting a commercial power supply 47 into a DC power supply, and supplies power to portable computer 11.

Expansion unit 41 is docked with portable computer 11 via connector 24. Second battery 42 of expansion unit 41 is charged by power-supply switching unit 22 using commercial power supply 47. Second battery 42 is connected to power-supply switching unit 22 of portable computer 11 by a power-supply cable 43. Expansion unit 41 is provided with an eject request switch (SW) 45 and a status Light Emitting Diode (LED) 46. Sense/control signal line 20 extends into expansion unit 41 from embedded controller 19 set in portable computer 11. Eject request switch (SW) 45 is connected to sense/control signal line 20. An event in expansion unit 41 is input to sense/control signal line 20 in the form of a pulse.

Main battery 21 and second battery 42 are respectively allowed to have a configuration different from that described above. That is, a primary battery (dry battery) or a secondary battery having a relatively small capacity can be used as main battery 21, and a secondary battery having a large capacity can be used as second battery 42. In this case, it is also possible to provide a structure without using built-in power-supply switching unit 22 as a battery charger. That is, second battery 42 can be taken out of expansion unit 41 and can be charged by using an external battery charger. This is suitable when expansion unit 41 is used at a location where commercial power supply 47 cannot be used for secondary battery 42.

When expansion unit 41 is undocked while second battery 42 is being discharged or charged, portable computer 11 is shut down. This is because portable computer 11 uses second battery 42 of expansion unit 41 when expansion unit 41 is docked. When expansion unit 41 is undocked, second battery 42 cannot be used, and portable computer 11 must switch power-supply routes from second battery 42 to main battery 21 of portable computer 11 (from a route 43 to a route 23). However, because it takes a long time to switch the power-supply routes, it is impossible to immediately correspond to undocking of expansion unit 41. However, this situation may be unavoidable for a system for supporting hot docking/undocking and warm-docking/undocking.

To avoid the above-mentioned problem, it is possible to hot undock or warm undock expansion unit 41 without shutting down portable computer 11 by controlling second battery 42 of expansion unit 41 and main battery 21 of portable computer 11.

Under the state in which expansion unit 41 is docked to portable computer 11, status LED 46 provided for expansion unit 41 is continuously turned on while portable computer 11 uses second battery 42 of expansion unit 41 as a resource. By viewing that status LED 46 is turned on, a user can recognize that second battery 42 supplies power. Therefore, it is possible to prevent expansion unit 41 having built-in second battery 42 from being carelessly undocked.

Figure 2:
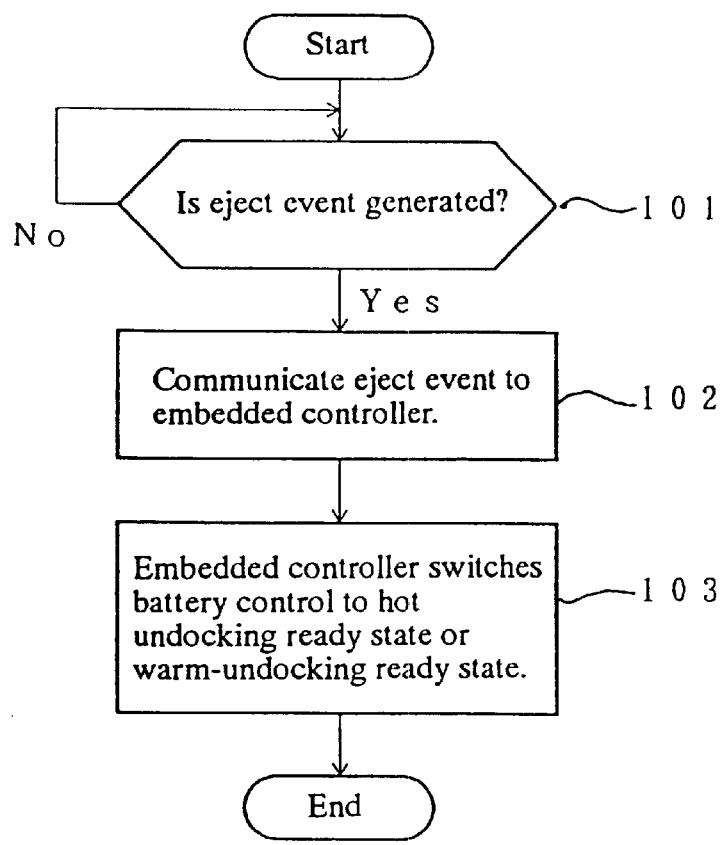
FIG. 2 is a flow chart showing a method for hot undocking or warm undocking the portable computer from the expansion unit shown in FIG. 1.

With reference now to FIG. 2, there is illustrated a flow chart showing a method for hot undocking or warm undocking portable computer 11 from expansion unit 41, in accordance with a first embodiment of the present invention. To hot undock or warm undock expansion unit 41, it is necessary to logically and electrically separate a resource having been used up to that point of time by expansion unit 41. Therefore, an eject event is first generated. The following two methods can be utilized to generate an eject event:

(1) By selecting the applet of an operating system (OS). The applet represents a small program. Specifically, an icon showing hot undocking or warm undocking displayed on a display screen is selected; or (2) By operating eject request switch (SW) 45 provided within expansion unit 41. When an eject event is generated as the result of either method (1) or method (2), the result from step 101 is Yes. In step 102, the generated eject event is communicated to embedded controller 19 of portable computer 11 through sense/control signal line 20. Embedded controller 19 receiving a signal indicating that eject event is generated controls power-supply switching unit 22 to switch the battery control to a hot undocking ready state or warm undocking ready state.

Figure 3:
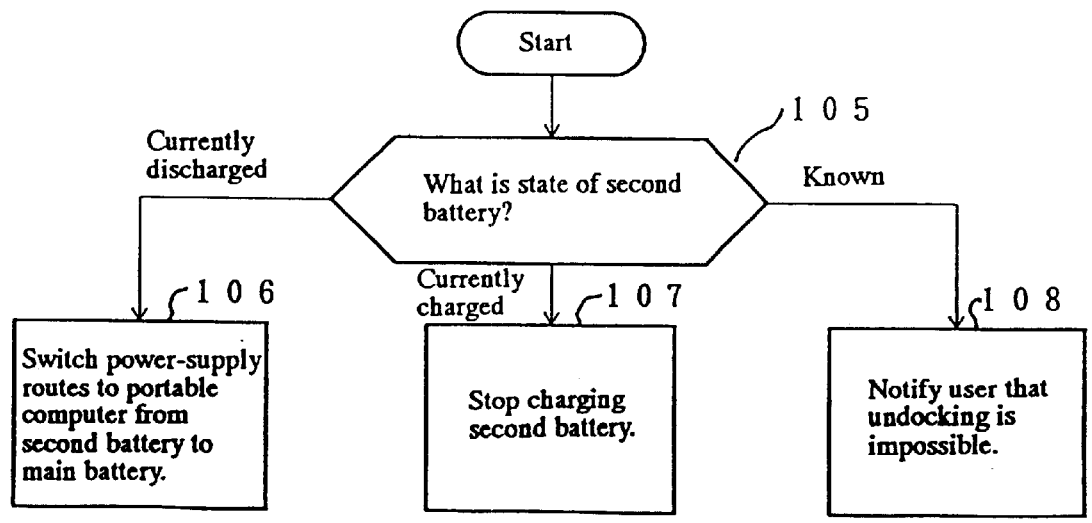
FIG. 3 is a flow chart showing operations of the embedded controller in the portable computer from FIG. 1.

Subsequent operations of embedded controller 19 are described below by referring to the flow chart shown in FIG. 3. In step 105, embedded controller 19 checks the state of second battery 42. When second battery 42 is currently discharged, embedded controller 19 switches supply routes from second battery 42 to main battery 21 of portable computer 11 (step 106). When second battery 42 is currently charged, embedded controller 19 stops charging second battery 42 (step 107). When the state of second battery 42 cannot be obtained for any reason, embedded controller 19 notifies a user that undocking is impossible by turning on an LED (not illustrated) of expansion unit 41 different from status LED 46. Or, it is also permitted to turn on status LED 46 that is turned off under the hot undocking ready state or warm undocking ready state again. After the operation in step 106 or step 107 is completed, portable computer 11 is hot undocked or warm undocked from expansion unit 41.

As has been described above, the first embodiment allows hot undocking or warm undocking from expansion unit 41 without shutting down portable computer 11 because the control for switching main battery 21 of portable computer 11 and second battery 42 of expansion unit 41 is performed.

Figure 4:
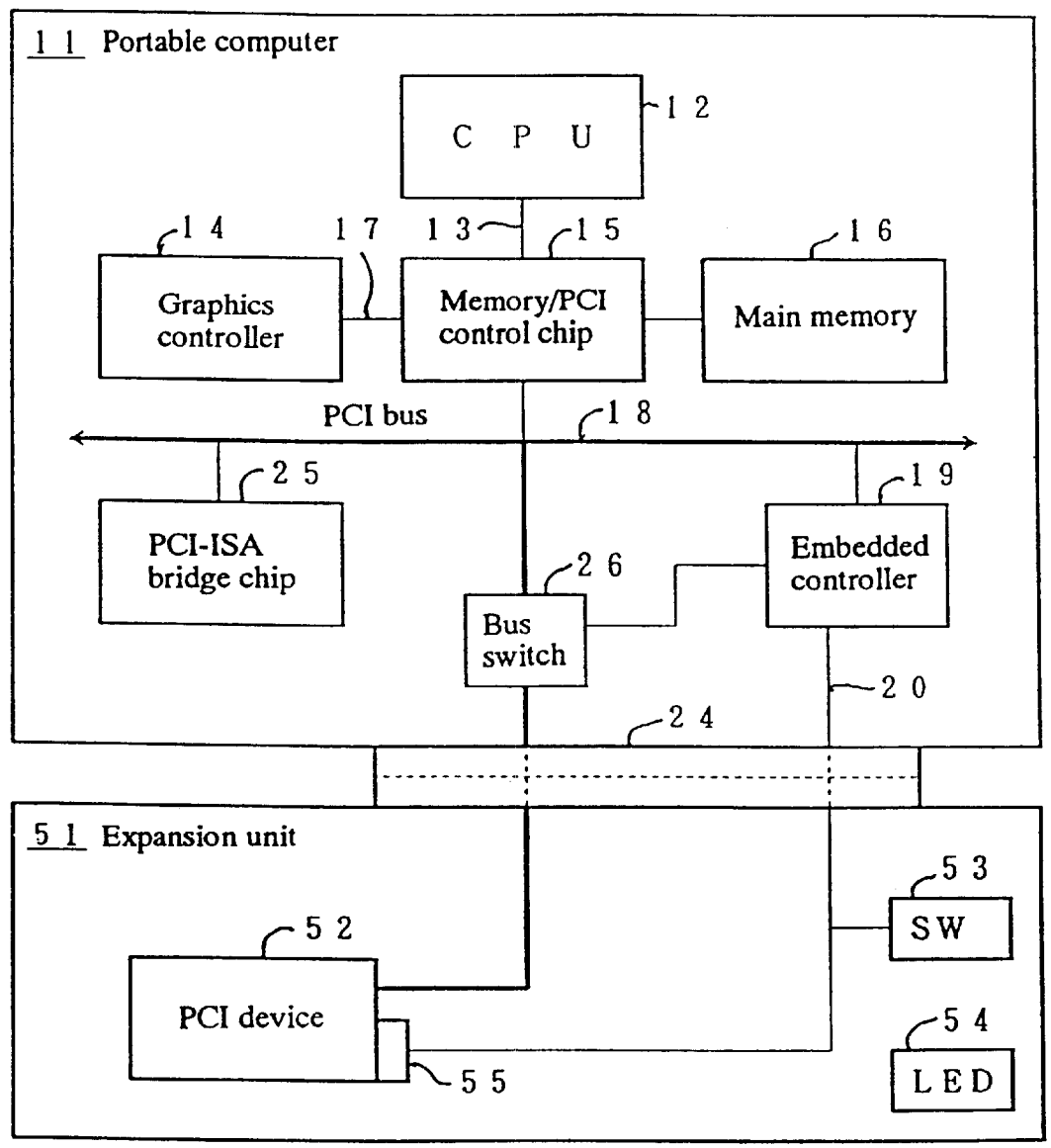
FIG. 4 is a block diagram depicting a portable computer and a docking station, in accordance with a second embodiment of the present invention.

With reference now to FIG. 4, there is an illustrated a block diagram of portable computer 11 and an expansion unit 51, in accordance with a second embodiment of the present invention. The main components within portable computer 11, such as CPU 12, CPU bus 13, graphics controller 14, memory/PCI control chip 15, main memory 16, AGP 17, PCI bus 18, embedded controller 19, and sense/control signal line 20, are similar to those components depicted in FIG. 1.

In addition, portable computer 11 also includes a PCI-ISA bridge chip 25 and a bus switch 26. PCI-ISA bridge chip 25 serves as a bridge chip for cross-linking a PCI bus with an ISA bus as generally referred to as "south bridge." ISA (Industry Standard Architecture) represents an international bus standard according to an expansion bus used for personal computers PC/AT manufactured by the International Business Machines Corporation. Because of recent advancement of the high integration art, PCI-ISA bridge chip 25 has been provided with various functions. For example, PIIX4E of Intel Corporation has a built-in IDE controller, an USB controller, and a power management controller. IDE will be described later in detail. USB (Universal Serial Bus) is a bus standard for personal computers jointly decided by Intel Corporation, Microsoft Corporation, Compaq Computer Corporation, Digital Equipment Corporation, Northern Telecom Limited, and NEC Corporation. USB is a serial bus and is used for connection of peripheral units of relatively low speed.

Bus switch 26 is set between PCI bus 18 and connector 24 to open/close the bus in accordance with the control by embedded controller 19.

Portable computer 11 is docked at expansion unit 51 via a connector 24. Expansion unit 51 is provided with a PCI device 52, an eject request switch (SW) 53, and a status LED 54 as main components. PCI device 52 is a resource to be connected to PCI bus 18. For example, PCI device 52 can serve as a PCI-PCI bridge chip, a LAN (Local Area Network) card, or a sound card. A sense/control signal line 20 extends into expansion unit 51 from embedded controller 19 within portable computer 11. A eject request switch (SW) 53 is connected to sense/control signal line 20 and an event in expansion unit 51 is input to line 20 in the form of a pulse.

The following two methods are utilized to expand PCI bus 18 of portable computer 11:

(1) By connecting a secondary-side PCI bus connected to a PCI-PCI bridge chip to an expansion connector when the PCI-PCI bridge chip is set in portable computer 11; and (2) By directly connecting PCI bus 18 with connector 24, setting bus switch 26 between bus 18 and connector 24, and opening or closing bus switch 26 when a PCI-PCI bridge chip is not contained within portable computer 11.

With method (1), because the PCI-PCI bridge chip is included within portable computer 11, the secondary-side PCI bus is independent of the primary-side PCI bus. Therefore, it is only necessary to operate the secondary-side PCI bus for docking or undocking. Moreover, hot docking/hot undocking can be performed. With method (2), because PCI bus 18 is directly connected to connector 24, hot docking/undocking cannot be performed. This is because PCI bus 18 always operates under a hot state and therefore, a serious error such as system hang-up may occur if docking/undocking is performed under PCI cycles (that means that hot docking/undocking is performed).

When method (2) is being used, docking/undocking is supported only when the portable computer is suspended or powered off. That is, it is impossible to support hot docking/undocking. This embodiment makes hot docking/undocking possible even for an inexpensive portable computer such as portable computer 11 having no PCI-PCI bridge chip. In the case of a portable computer provided with no PCI-PCI bridge chip, PCI bus 18 is directly connected to connector 24. Bus switch 26 is set between PCI bus 18 and connector 24.

Figure 5:
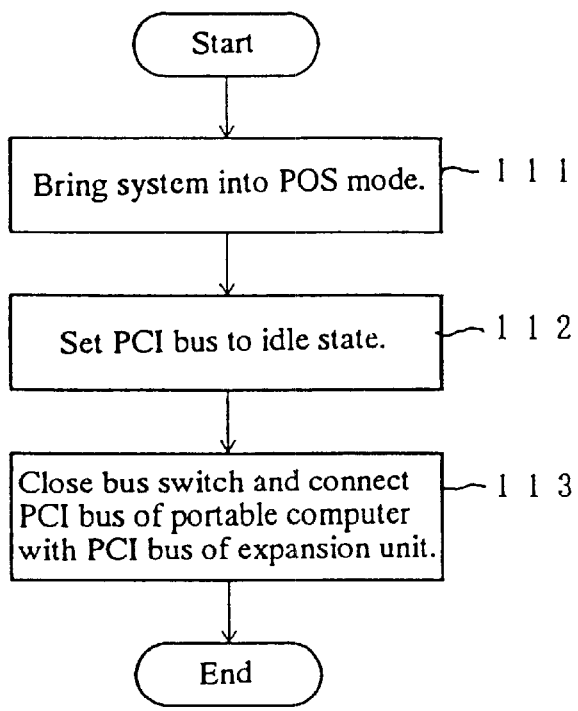
FIG. 5 is a flow chart showing a method for hot docking the portable computer to the docking station shown in FIG. 4.

Referring now to FIG. 5, there is depicted a flow chart of a method for hot docking portable computer 11 with expansion unit 51. First, a system is set to a Power On Suspend (POS) mode (step 111). The POS mode represents a state in which only CPU 12 and PCI bus 18 sleep. Because screen display does not disappear, a user does not sense that the system stops. To set the system to the POS mode, PCI-ISA bridge chip 25 is used. For example, PIIX4E of Intel Corporation can be used as PCI-ISA bridge chip 25. PIIX4E has a POS function for bringing the system into a suspended state as one of power management functions. Therefore, the system is set to the POS mode by using this function. When the system is set to the POS mode, it is possible to bring PCI bus 18 into an idle state (step 112). While PCI bus 18 is set to the idle state, bus switch 26 is closed to connect PCI bus 18 of portable computer 11 with PCI device 52 of expansion unit 51 (step 113).

Figure 6:
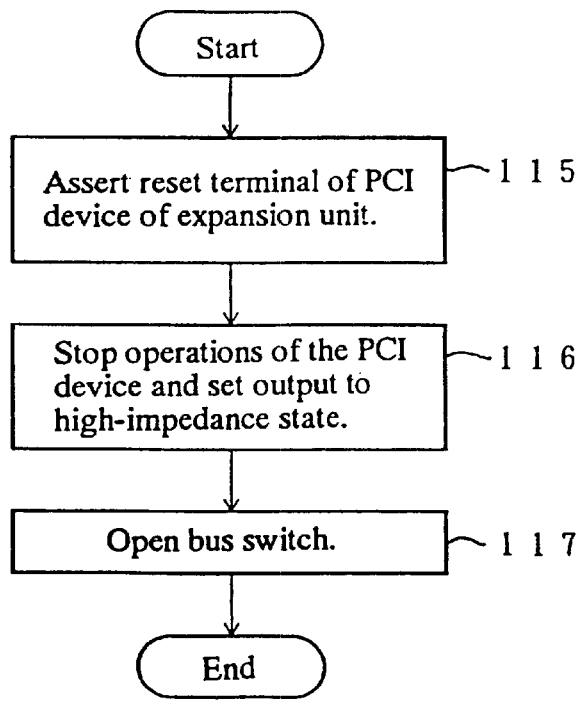
FIG. 6 is a flow chart showing a method for hot undocking the portable computer from the docking station shown in FIG. 4.

With reference now to FIG. 6, there is depicted a flow chart of a method for hot undocking portable computer 11 from expansion unit 51. First, embedded controller 19 asserts a reset terminal 55 of PCI device 52 of expansion unit 51 to be separated (step 115). Thereby, it is possible to stop operations of PCI device 52 and set an output to a high-impedance state (step 116). Thereafter, bus switch 26 is opened (step 117). After the above steps are executed, PCI bus 18 of portable computer 11 and PCI device 52 to be separated are electrically separated from each other. In this case, because the output of PCI device 52 of expansion unit 51 is set to a high-impedance state, PCI bus 18 of portable computer 11 is not influenced. Therefore, it is possible to operate bus switch 26 independently of condition of PCI bus 18.

According to this embodiment, even if there is no PCI-PCI bridge chip in portable computer 11, it is still possible to hot docking/undocking portable computer 11 with/from expansion unit 51 by setting bus switch 26 between PCI bus 18 and connector 24 of portable computer 11 and using the POS function of PCI-ISA bridge chip 25 and PCI device-52 reset function of embedded controller 19.

Figure 7:
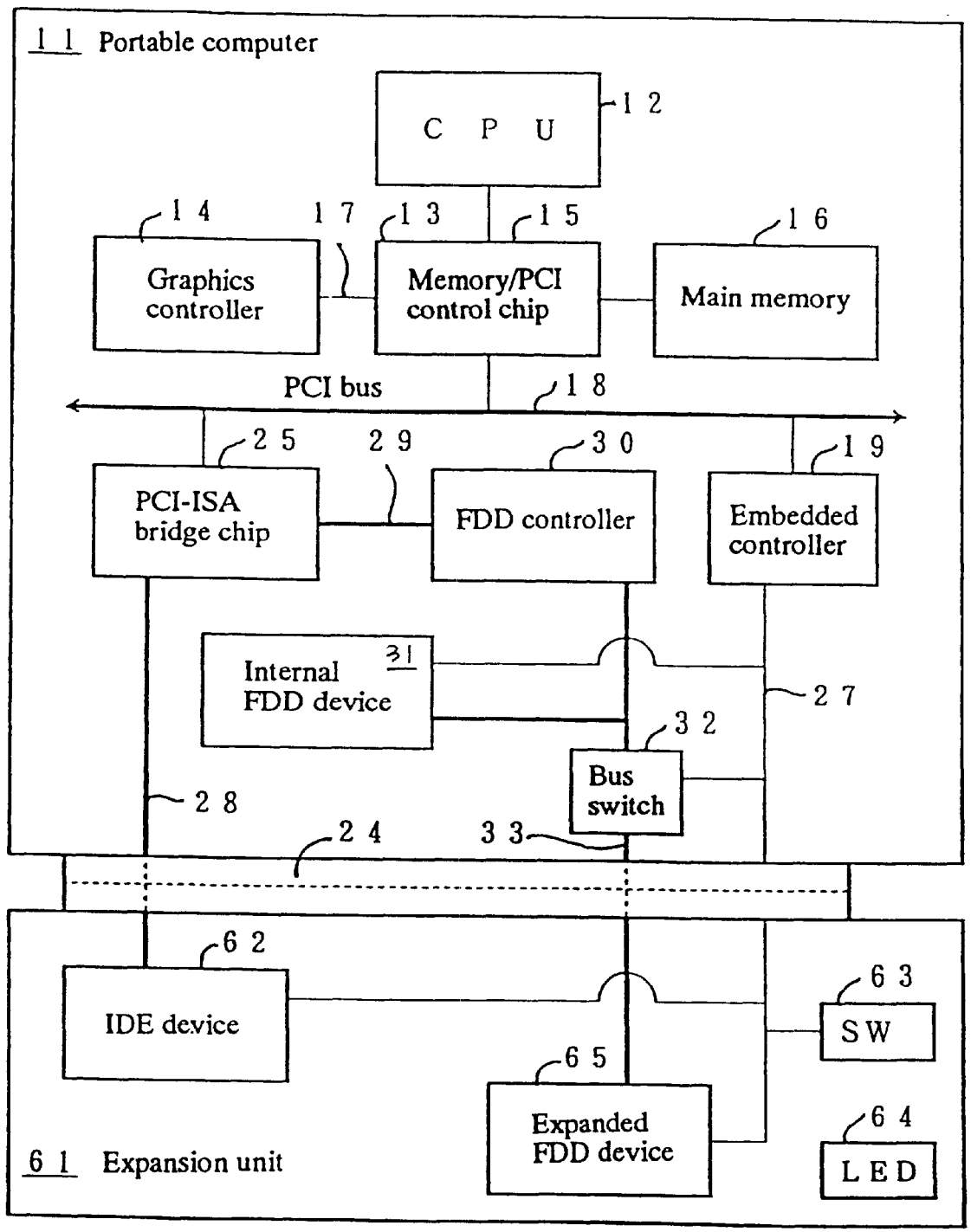
FIG. 7 is a block diagram depicting a portable computer and a docking station, in accordance with a third embodiment of the present invention.

Referring now to FIG. 7, there is depicted a block diagram of portable computer 11 and an expansion unit 61, in accordance with a third embodiment of the present invention. The main components within portable computer 11, such as CPU 12, CPU bus 13, graphics controller 14, memory/PCI control chip 15, main memory 16, AGP 17, PCI bus 18, embedded controller 19, and sense/control signal line 20, are similar to those components depicted in FIG. 1. Portable computer 11 further includes a PCI-ISA bridge chip 25, a sense/control signal line 27, an IDE interface 28, an ISA bus 29, a FDD controller 30, an internal FDD device 31, a bus switch 32, and a FDD interface 33.

Integrated Device Electronics (IDE) is one of the types of hard disk drives (HDDs). IDE was standardized by hard disk driver makers at the beginning and then, standardized by American National Standards Institute (ANSI) as AT Attachment (ATA). Thereafter, the specification for connecting a CD ROM drive to an IDE interface was decided as AT Attachment Packet Interface (ATAPI). A hard disk drive and a CD ROM drive used for a personal computer are generally connected by IDE.

Sense/control signal line 27 extends into portable computer 11 and up to expansion unit 61 from embedded controller 19. A sense signal for sensing the state of each device at the connection destination is transferred through signal line 27 and moreover, a control signal for controlling each device is transferred.

IDE interface 28 connects PCI-ISA bridge chip 25 of portable computer 11 with IDE device 26 of expansion unit 61. FDD controller 30 controls a floppy disk drive (FDD). In the case of this embodiment, FDD controller 30 controls internal FDD device 31 and an expanded FDD device 65.

Bus switch 32 is set between FDD controller 30 and connector 24 to open/close FDD interface 33 in accordance with the control by embedded controller 19. FDD interface 33 connects FDD controller 30 with expanded FDD device 65. Expansion unit 61 is docked with portable computer 11 by connector 24. Expansion unit 51 has an IDE device 62, eject request switch (SW) 63, status LED 64, and expanded FDD device 65 as main components. IDE device 62 is a device to be connected to IDE interface 28, which serves as a hard disk drive (HDD) or CD-ROM drive. Expanded FDD device 65 is a device to be connected to FDD interface 33, which generally serves as a floppy disk drive (FDD). Sense/control signal line 27 extends into expansion unit 51 from embedded controller 19 disposed in the portable computer 11. Eject request switch (SW) 63 is connected to sense/control signal line 27 and moreover, an event in expansion unit 61 is input to line 27 in the form of a pulse.

When expansion unit 61, which includes IDE device 62 and FDD device 65, is hot docked to portable computer 11, latch-up will occur if IDE interface 28 and FDD interface 33 of IDE device 62 and FDD device 65 are hot docked while they are active. As a result, these devices can be damaged. Moreover, an FDD device has an intrinsic problem of access control switching. When expansion unit 61 is hot docked, access control of FDD controller 30 is required to switch from internal FDD device 31 of portable computer 11 to expanded FDD device 65 of expansion unit 61. This embodiment makes it possible to completely perform electrical connection between these devices and simultaneously perform the access control for FDD device 65. Hot docking and hot undocking procedures by this embodiment are described below in accordance with the following sequence.

A. Hot Docking Procedure

When a user mechanically docks portable computer 11 to expansion unit 61, embedded controller 19 of portable computer 11 senses that portable computer 11 is mechanically docking to expansion unit 61 through sense/control signal line 27 and executes the hot docking procedure described below.

A-1. Hot Docking Procedure for IDE Device

Figure 8:
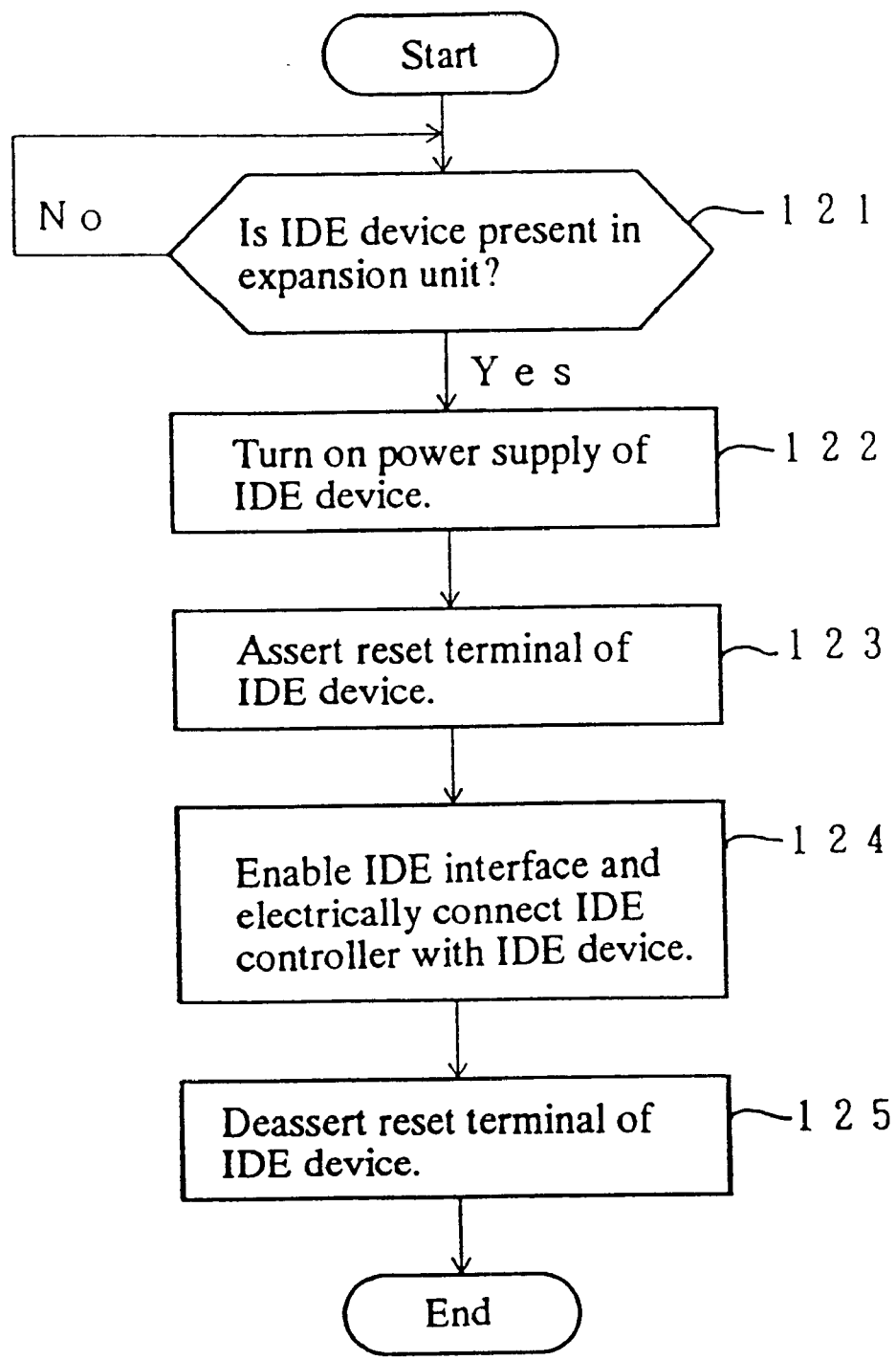
FIG. 8 is a flow chart showing a method for hot docking an IDE device to the portable computer shown in FIG. 7.

When expansion unit 61 is not unconnected, IDE interface 28 is kept in a high-impedance state (same as electrically unconnected state). This is realized by the function of PIIX4E manufactured by Intel Corporation used as PCI-ISA bridge chip 25 in this embodiment. Hot docking procedure for expansion unit 61 having IDE device 62 is described in the flow chart shown in FIG. 8. When expansion unit 61 is connected, embedded controller 19 reads from a device ID whether IDE device 62 is present in expansion unit 61 (step 121). When the IDE device is present (Yes), controller 19 starts step 122. In step 122, embedded controller 19 turns on the power supply of IDE device 62. Then, controller 19 asserts the reset terminal of IDE device 62 (step 123). Then, controller 19 enables IDE interface 28 and electrically connects IDE controller (built in PCI-ISA bridge chip 25) of portable computer 11 with IDE device 62 (step 124). Finally, controller 19 deasserts the reset terminal of IDE device 62 (step 125).

A-2. Hot Docking Procedure for FDD Device

Figure 9:
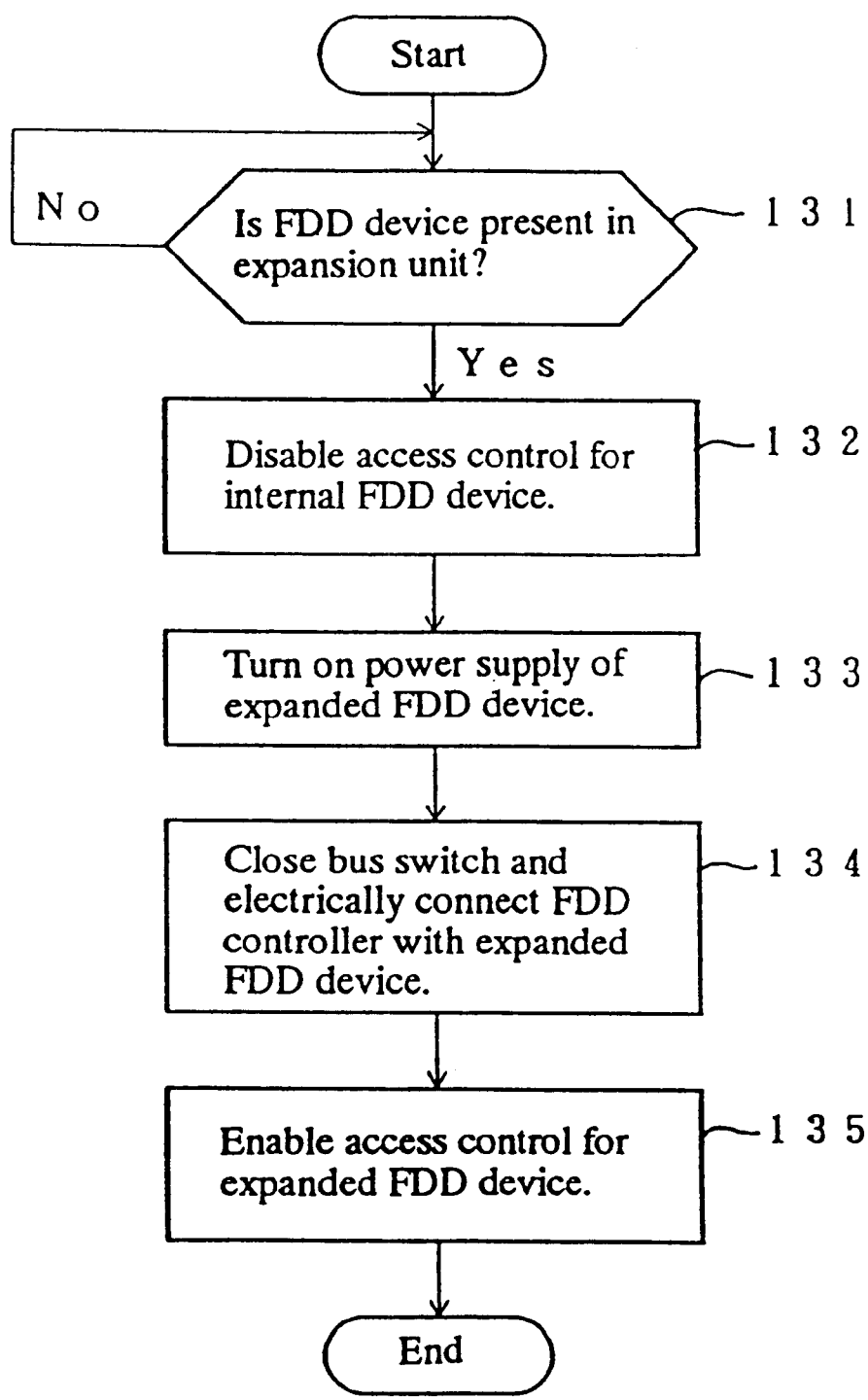
FIG. 9 is a flow chart showing a method for hot docking an expanded FDD device to the portable computer shown in FIG. 7.

A hot docking procedure for expanded FDD device 65 is described in the flow chart shown in FIG. 9. When expansion unit 61 is not connected, FDD interface 33 is electrically separated by bus switch 32. When expansion unit 61 is connected, embedded controller 19 reads by a sense signal passing through sense/control signal line 27 whether expanded FDD device 65 is present in expansion unit 61 (step 131). When expanded FDD device 65 is present (Yes), controller 19 starts step 132. In step 132, embedded controller 19 disables the access control of FDD controller 30 for the internal FDD device. Then, embedded controller 19 turns on the power supply of expanded FDD device 65 (step 133). Then, controller 19 closes bus switch 32 and electrically connects FDD controller 30 of portable computer 11 with expanded FDD device 65 (step 134). Finally, controller 19 enables the access control of FDD controller 30 for expanded FDD device 65.

After the above steps are executed, an FDD device to be access controlled by FDD controller 30 of portable computer 11 is switched from internal FDD device 31 to expanded FDD device 65.

B. Hot Undocking Procedure

When a user operates eject request switch (SW) 63 provided for expansion unit 61, an eject event occurs. The eject event reaches the embedded controller 19 after passing through sense/control signal line 27. Embedded controller 19 receiving the eject event executes the following undocking procedure.

B-1. Hot Undocking procedure for IDE Device

Figure 10:
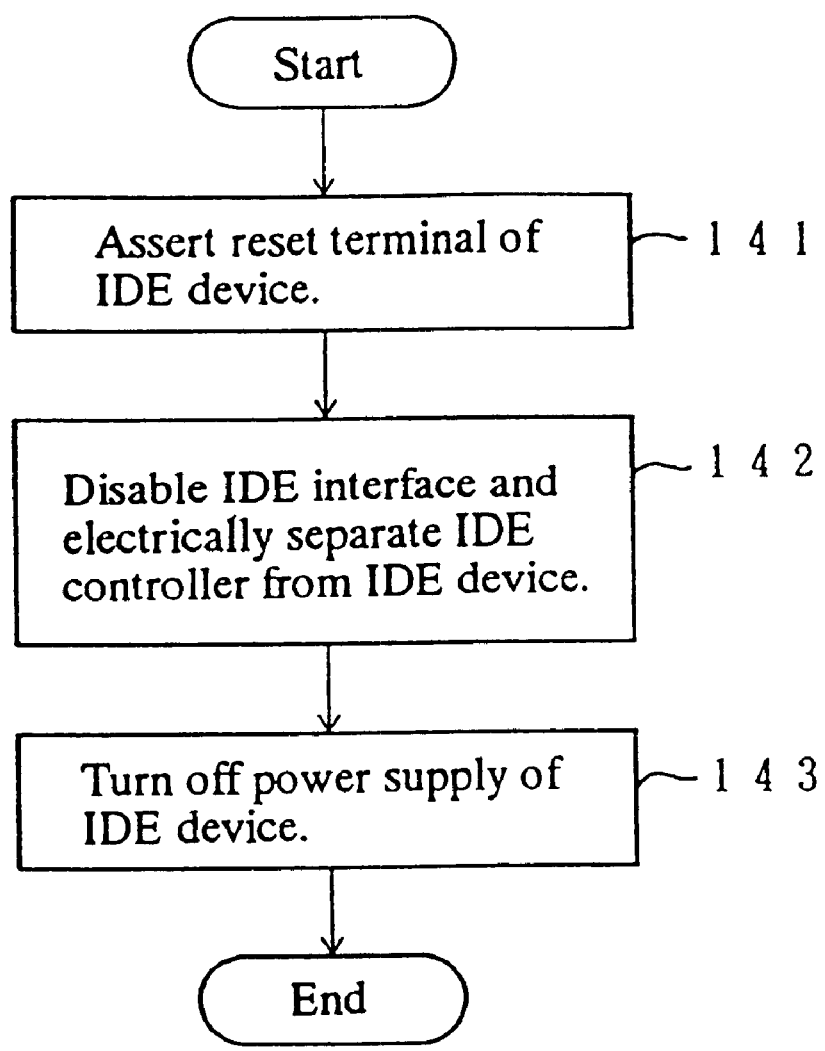
FIG. 10 is a flow chart showing a method for hot undocking an IDE device from the portable computer shown in FIG. 7.

A hot undocking procedure for IDE device 62 is described in the flow chart shown in FIG. 10. First, embedded controller 19 asserts the reset terminal of IDE device 62 (step 141). Then, controller 19 disables IDE interface 28 and electrically separates IDE controller (built in the PCI-ISA bridge chip 25) of portable computer 11 from IDE device 62 (step 142). Finally, controller 19 turns off the power supply of IDE device 62 (step 143).

B-2. Hot Undocking Procedure for FDD Device

Figure 11:
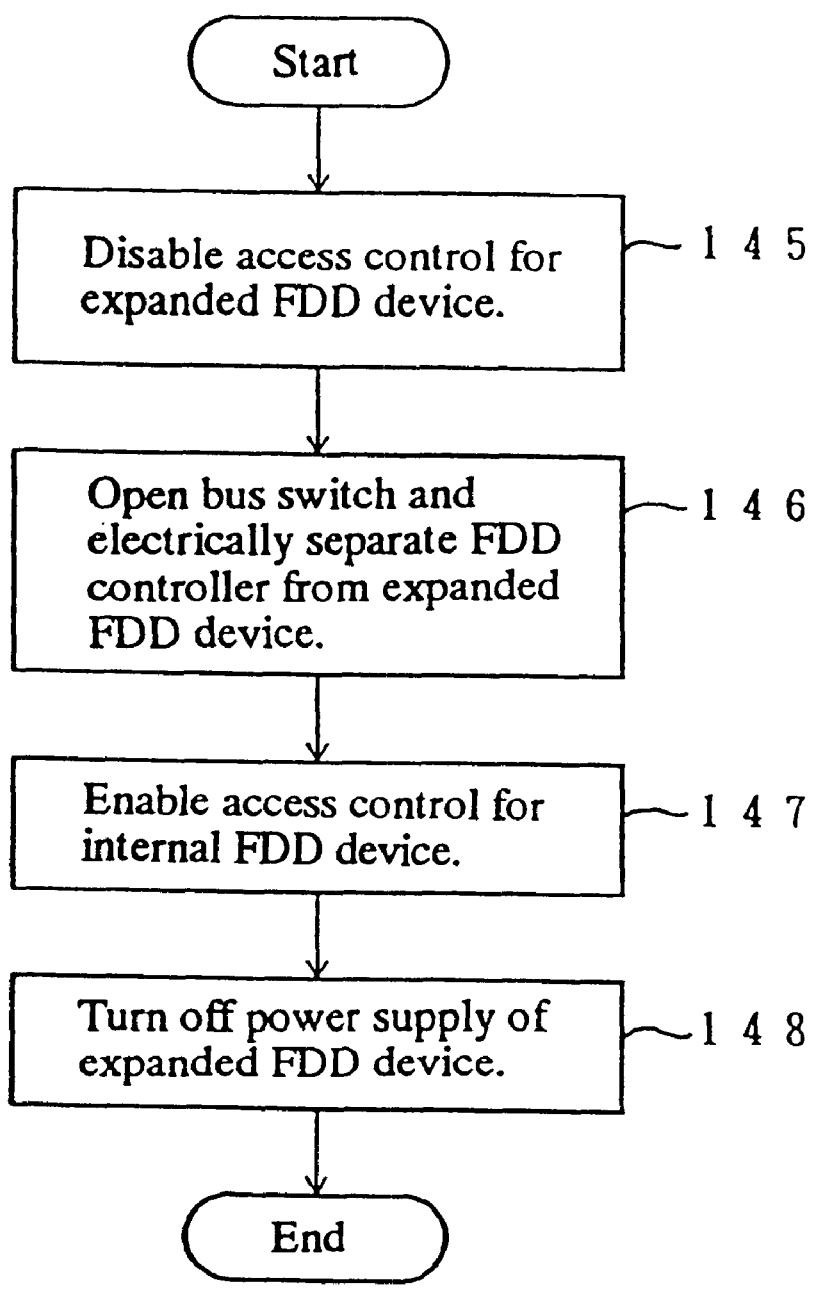
FIG. 11 is a flow chart showing a method for hot undocking an expanded FDD device from the portable computer shown in FIG. 7.

A hot undocking procedure for expanded FDD device 65 is described in the flow chart shown in FIG. 11. First, embedded controller 19 disables the access control of FDD controller 30 for expanded FDD device 65 (step 145). Then, controller 19 opens bus switch 32 and electrically separates FDD controller 30 from expanded FDD device 65 (step 146). Then, controller 19 enables the access control of FDD controller 30 for internal FDD device 31 (step 147).

Finally, controller 19 turns off the power supply of expanded FDD device 65 (step 148).

After the above steps are executed, an FDD device to be access-controlled by FDD controller 30 of portable computer 11 is switched from expanded FDD device 65 to internal FDD device 31.

With this embodiment, when hot docking/undocking portable computer 11 to/from expansion unit 61 having IDE device 62 and expanded FDD device 65, it is possible to completely perform electrical connection/separation of these devices and simultaneously switch access controls for the FDD device.

Figure 12:
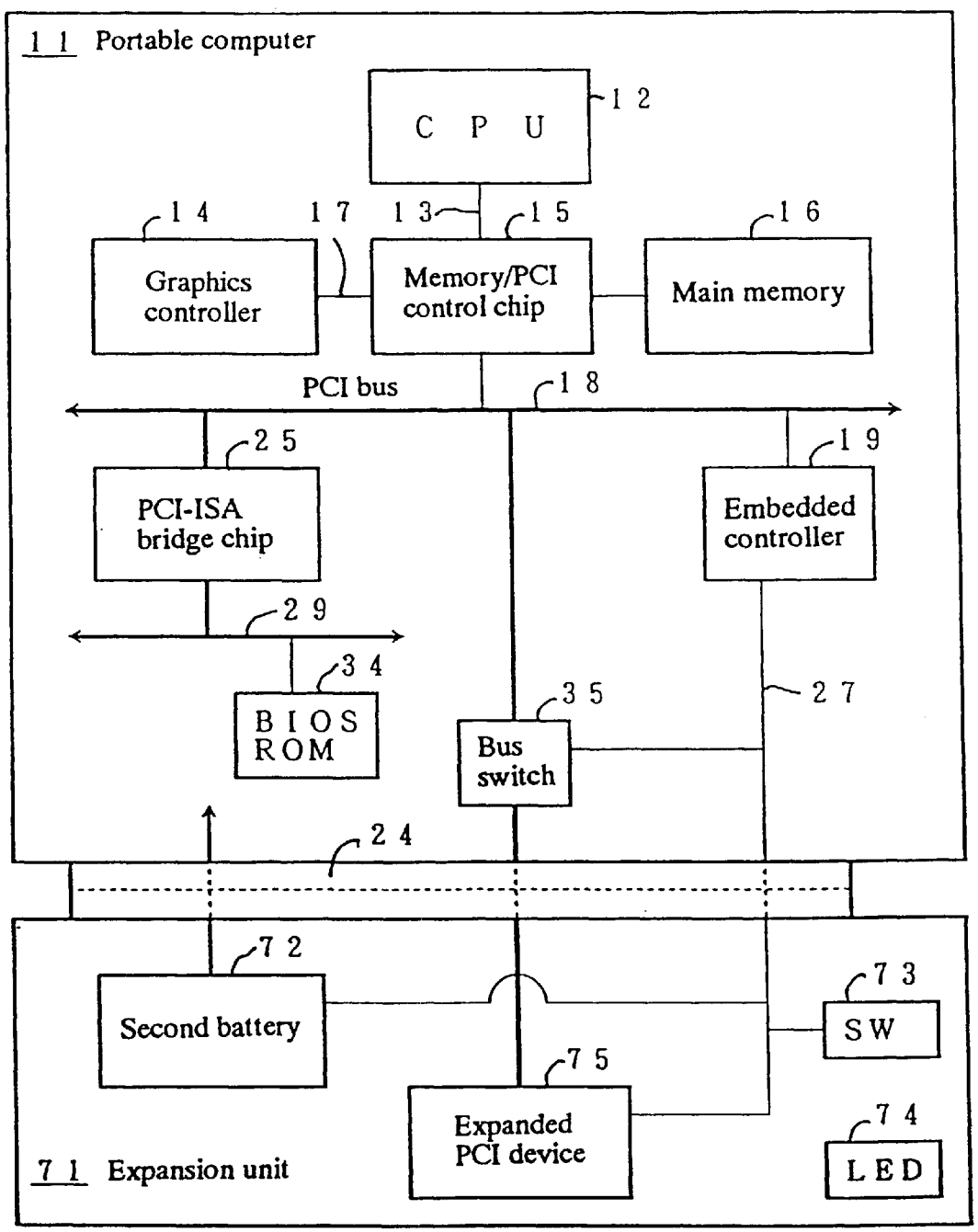
FIG. 12 is a block diagram depicting a portable computer and a docking station, in accordance with a fourth embodiment of the present invention.

With reference now to FIG. 12, there is depicted a block diagram of a portable computer 11 and an expansion unit 71 in accordance with a fourth embodiment of the present invention. The main components within portable computer 11, such as CPU 12, CPU bus 13, graphics controller 14, memory/PCI control chip 15, main memory 16, AGP 17, PCI bus 18, embedded controller 19, and sense/control signal line 20, are similar to those components depicted in FIG. 1. Portable computer 11 has a PCI-ISA bridge chip 25, sense/control signal line 27, ISA bus 29, BIOS ROM 34, and bus switch 35 as main components in addition to the above components. Because PCI-ISA bridge chip 25, sense/control signal line 27, and ISA bus 29 are the same as those shown in FIG. 7, their descriptions are omitted.

BIOS ROM 34 is a ROM (Read Only Memory) storing a BIOS. BIOS (Basic Input/output System) is software for converting an instruction of an OS into a command to be transferred between hardware components. Bus switch 35 is placed between PCI bus 18 of portable computer 11 and connector 24 to connect/separate PCI bus 18 with/from an expanded PCI device 75 (to be described later). Expansion unit 71 is docked with portable computer 11 by connector 24. In this embodiment, expansion unit 71 has a second battery 72 and expanded PCI device 75 as resources. Second battery 72 is the same as that of the embodiment 1. Expanded PCI device 75 is the same as that of the embodiment 2. Expansion unit 71 is provided with an eject request switch (SW) 73 and a status LED 74. Sense/control signal line 27 extends into expansion unit 71 from embedded controller 19 set in portable computer 11. Eject request switch (SW) 73 is connected to sense/control signal line 27 and moreover, an event in expansion unit 71 is input to line 27 in the form of a pulse.

When an OS for supporting hot docking/undocking and warm docking/undocking hot undocks or warm undocks expansion unit 71, it must be requested for the OS to eject the resource of expansion unit 71 to be undocked without fail. The OS receiving the request must release this resource from its control. That is, it is inhibited to undock expansion unit 71 without outputting an eject request to the OS (this is referred to as surprised undocking). When bringing a system into a suspended state while docking expansion unit 71, it is impossible to remove expansion unit 71 under the suspended state.

Thus, an OS for supporting warm undocking must eject all resources to be probably warm undocked (such as second battery 72, expanded PCI device 75 or the like of expansion unit 71) whenever the system is set to a suspended state. However, the above method has the following disadvantages. First, the time required for resuming increases because it is necessary to perform enumeration of a resource whenever the system resumes from the suspended state. Second, it is impossible to assure stable operations because the system is shut down if undocking is performed while second battery 72 is discharged (supplying power to portable computer 11) when expansion unit 71 has second battery 72.

Figure 13:
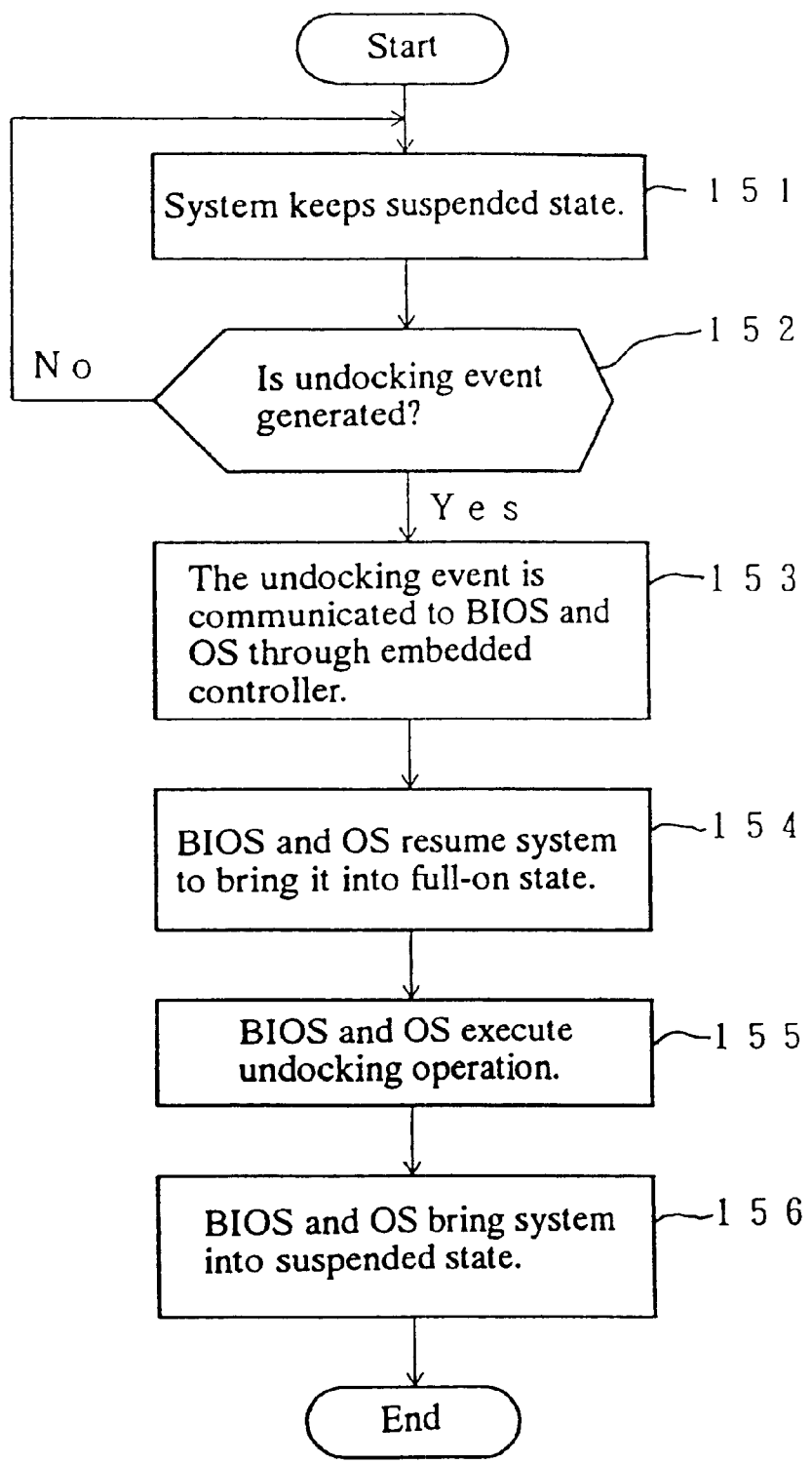
FIG. 13 is a flow chart depicting operations of the fourth embodiment of the present invention.

This embodiment eliminates the above-mentioned problems. Operations of this embodiment are described in the flow chart shown in FIG. 13. First, the system is kept in a suspended state (step 151). Embedded controller 19 of portable computer 11 monitors whether an undocking event occurs (step 152). When a user presses the eject request switch 73, an undocking event occurs. When embedded controller 19 senses the undocking event through sense/control signal line 27 (Yes), it starts step 153. In step 153, embedded controller 19 communicates the sensed undocking event to the BIOS and OS. Then, the BIOS and OS receiving the undocking event change the system from the suspended state to the normal operation state (step 154). In this case, the normal operation state represents a state capable of operating a computer, other than power-off state, suspended state, hibernation state, and standby state. Thereafter, the BIOS and OS execute the undocking operation (step 155). Because the undocking operation is executed under the normal operation state, it does not correspond to surprised undocking. The BIOS and OS electrically and logically separate resources (such as second battery 72 and expanded PCI device 75) of expansion unit 71 from portable computer 11. Finally, the BIOS and OS bring the system into a suspended state (step 156).

After the above steps are executed, the warm undocking operation by this embodiment is completed. Warm undocking by this embodiment can be regarded as dummy warm undocking because operations are performed that the suspended system is temporarily brought into a full-on state; the undocking operation is performed in the full-on state; and the full-on state is returned to the suspended state. This embodiment makes it possible to perform warm undocking without being contrary to rules for inhibiting surprised undocking. Therefore, it is possible to perform warm undocking without ejecting resources of an expansion unit whenever the system is brought into a suspended state.

Although different labels, such as 41, 51, 61, and 71, are used to refer to an expansion unit in different embodiments, this does not represent that four different types of expansion units are present. It is possible to obtain a desired expansion unit by selecting and combining necessary expansion units out of expansion units 41, 51, 61, and 71.

Each of the above-described methods of the present invention for hot docking/undocking a portable computer with/from an expansion unit can be formed into a program by using various programming languages (hereafter referred to as "hot docking/undocking program." The hot docking/undocking program is recorded in a computer-readable recording medium. The recording medium can use a memory to be mounted on a computer system such as a ROM (Read Only Memory), EEPROM (Electrically Erasable Programmable Read Only Memory), or flash EEPROM, a portable recording medium such as a floppy disk (FD), CD-ROM (read only memory using a compact disc), or MO (magneto-optical) disk, or an external storage device provided for a server computer connected to a network.

The undocking program recorded in the recording medium is stored in a computer as described below.

Hereafter, the computer is referred to as portable computer 11 and expansion unit 51 shown in FIG. 4 or portable computer 11 and expansion unit 61 shown in FIG. 7. If the recording medium is a read only memory (ROM), the hot docking/undocking program can be stored in the ROM during the fabrication process. Thereafter, the ROM is mounted on portable computer 11. If the recording medium is a flash EEPROM, the EEPROM is mounted on the portable computer 11, and the hot docking/undocking program can subsequently be written in the EEPROM through on-board writing.

If the recording medium is a portable recording medium such as a CD ROM, the CD ROM storing an undocking program is set to IDE device 62 of expansion unit 61 (FIG. 7) to read a hot docking/undocking program from the CD ROM.

Then, the help display program of the hot docking/undocking program is stored in the IDE device (not illustrated)) of portable computer 11. If the hot docking/undocking program is overwritten on a flash EEPROM. The same is also applied to a case in which a recording medium storing a hot docking/undocking program uses other portable recording medium such as a floppy disk.

If the recording medium is an external storage device on a network, the undocking program recorded in the external storage device is downloaded through the network. A network connector can be constituted as PCI device 52 of expansion unit 51 from FIG. 4. The downloaded hot docking/undocking program is stored and kept in the IDE device (not illustrated) of portable computer 11 similarly to the above mentioned.

The present invention has the following advantages through a method for hot docking/undocking a portable computer with/from an expansion unit. Because the control for switching the main battery of a portable computer and the second battery of an expansion unit is performed, it is possible to hot undock or warm undock the expansion unit without shutting down the portable computer. Moreover, even in the case of an inexpensive system having no PCI-PCI bridge chip in a portable computer, it is possible to hot dock/undock the portable computer with/from an expansion unit by setting a bus switch between the PCI bus of the portable computer and connector and performing necessary control.

When hot docking/undocking a portable computer with/from an expansion unit having an IDE device and an expanded FDD device, it is possible to completely perform electrical connection/separation of these devices as well as switch access controls for the FDD device at the same time.

Because warm undocking can be performed without conflicting with the rules for inhibiting surprised undocking, it is possible to perform the warm undocking without ejecting resources of an expansion unit whenever a system is brought into a suspended state.

While the invention has been particularly shown and described with reference to a preferred embodiment, it will be understood by those skilled in the art that various changes in form and detail may be made therein without departing from the spirit and scope of the invention.

What is claimed is:

1. A method for hot undocking a portable computer having a main battery from an expansion unit having a second battery, said method comprising the steps of:

in response to an eject event, determining a condition of said second battery;

in response to said second battery is in a discharging condition, switching a power supply route from said second battery of said expansion unit to said main battery of said portable computer;

in response to said second battery is in a charging condition, suspending said charging condition; and performing a hot undocking of said portable computer from said expansion unit.

2. The method according to claim 1, wherein said method further including a step of performing a warm undocking of said portable computer from said expansion unit.

* * * * *